US009379822B2

(12) United States Patent
Iizuka et al.

(10) Patent No.: US 9,379,822 B2
(45) Date of Patent: Jun. 28, 2016

(54) OPTICAL RECEIVING APPARATUS

(75) Inventors: Hiroshi Iizuka, Kawasaki (JP); Takeshi Sakamoto, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 1026 days.

(21) Appl. No.: 13/411,794

(22) Filed: Mar. 5, 2012

(65) Prior Publication Data

US 2012/0237211 A1 Sep. 20, 2012

(30) Foreign Application Priority Data

Mar. 15, 2011 (JP) ................. 2011-056874

(51) Int. Cl.
*H04B 10/00* (2013.01)
*H04B 10/61* (2013.01)

(52) U.S. Cl.
CPC .............. *H04B 10/611* (2013.01); *H04B 10/61* (2013.01); *H04B 10/6164* (2013.01)

(58) Field of Classification Search
CPC .... H04B 10/61; H04B 10/63; H04B 10/6165; H04B 10/64; H04B 10/6164
USPC .......................................... 398/204
See application file for complete search history.

(56) References Cited

U.S. PATENT DOCUMENTS

| 5,774,243 | A * | 6/1998 | Majima ............................. 398/95 |
| 7,027,743 | B1 * | 4/2006 | Tucker ................... H04B 10/64 356/484 |
| 7,899,340 | B1 * | 3/2011 | Bontu ..................... H04B 10/60 398/203 |
| 8,014,685 | B2 * | 9/2011 | Hoshida ........................ 398/205 |
| 8,437,645 | B2 * | 5/2013 | Boffi ....................... H04B 10/61 398/152 |
| 8,611,744 | B2 * | 12/2013 | Van Leeuwen .................. 398/76 |
| 8,923,707 | B2 * | 12/2014 | Goldfarb .......... H04B 10/50597 398/203 |
| 9,231,787 | B1 * | 1/2016 | Zamani ................ H04L 25/024 |
| 2002/0167708 | A1 * | 11/2002 | Tsao ..................... H04B 10/118 398/204 |
| 2003/0179988 | A1 | 9/2003 | Kai et al. |
| 2005/0078317 | A1 * | 4/2005 | Law ........................ G01J 9/04 356/484 |
| 2005/0202793 | A1 * | 9/2005 | Baney ................... H04B 10/64 455/189.1 |
| 2008/0131124 | A1 * | 6/2008 | Nam et al. ...................... 398/67 |
| 2008/0145066 | A1 * | 6/2008 | Hoshida ................ H04B 10/61 398/205 |
| 2009/0047030 | A1 * | 2/2009 | Hoshida ................ H04B 10/60 398/205 |
| 2010/0111544 | A1 | 5/2010 | Oda et al. |
| 2010/0254718 | A1 * | 10/2010 | Oda ....................... H04B 10/60 398/202 |
| 2011/0038631 | A1 * | 2/2011 | Doerr .............................. 398/65 |
| 2011/0085797 | A1 * | 4/2011 | Xu ........................ H04B 10/60 398/27 |
| 2011/0305457 | A1 * | 12/2011 | Kikuchi ........................... 398/65 |
| 2012/0076507 | A1 * | 3/2012 | Roberts ............... H04B 10/613 398/205 |
| 2012/0213529 | A1 * | 8/2012 | Hedekvist .......... H04B 10/6161 398/142 |
| 2013/0170829 | A1 * | 7/2013 | Khatana ............ H04B 10/6165 398/27 |
| 2014/0016927 | A1 * | 1/2014 | Khatana ................ H04B 10/61 398/25 |

(Continued)

FOREIGN PATENT DOCUMENTS

| JP | 5-153052 | 6/1993 |
| JP | 6-338856 | 12/1994 |
| JP | 9-162849 | 6/1997 |

(Continued)

*Primary Examiner* — Tanya Motsinger
(74) *Attorney, Agent, or Firm* — Staas & Halsey LLP

(57) ABSTRACT

There is provided an optical receiving apparatus, including a receiver configured to perform coherent reception by mixing first light of a received optical signal and second light generated by a local oscillator, a monitor configured to monitor a first frequency of the first light, and a controller configured to control a second frequency of the second light, based on a difference between the first frequency and the second frequency so as to reduce the difference.

6 Claims, 12 Drawing Sheets

(56) References Cited

U.S. PATENT DOCUMENTS

2014/0086582 A1* 3/2014 Iwano .................... H04B 10/61
                                                           398/48
2014/0328588 A1* 11/2014 Sakai ................ H04B 10/6164
                                                           398/38

FOREIGN PATENT DOCUMENTS

| | | |
|---|---|---|
| JP | 2003-209533 | 7/2003 |
| JP | 2003-279909 | 10/2003 |
| JP | 2010-109847 | 5/2010 |

* cited by examiner

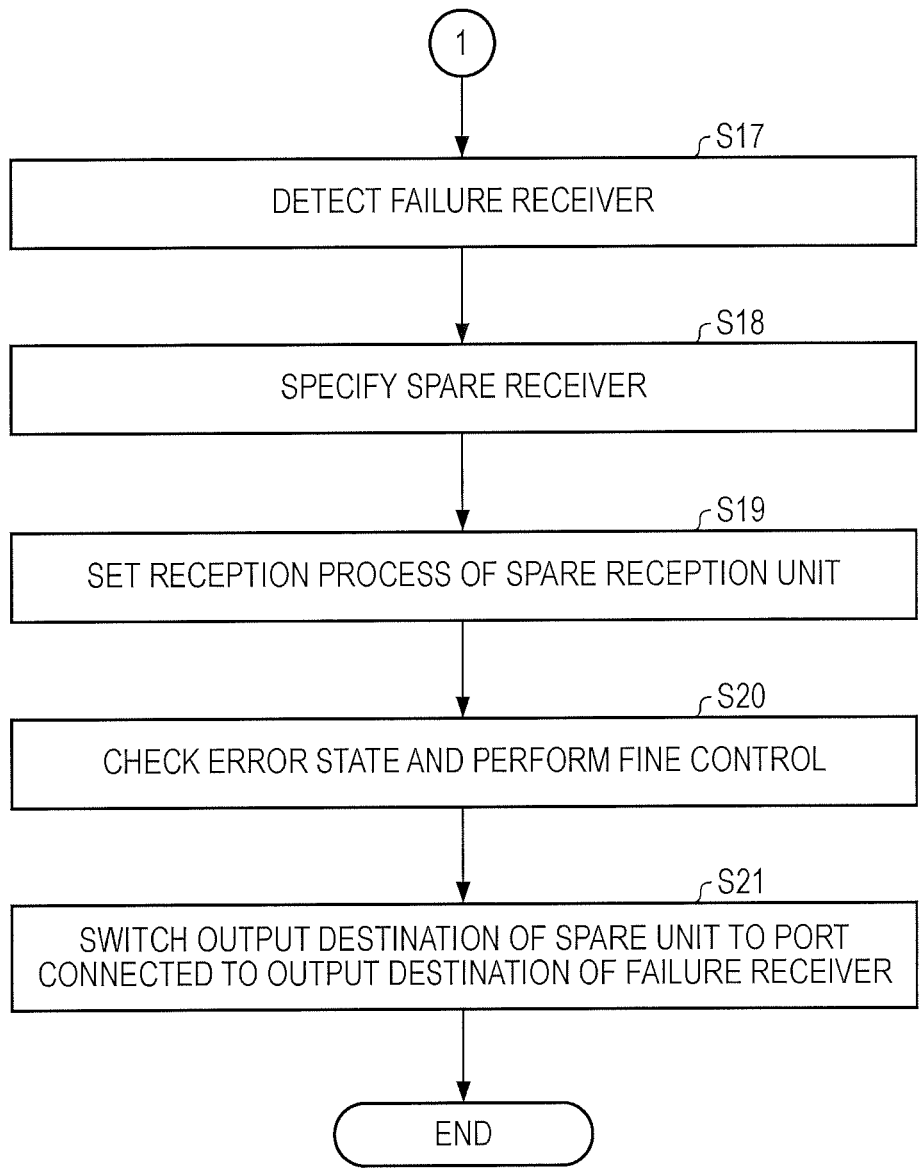

OPTICAL RECEIVING APPARATUS

CROSS-REFERENCE TO RELATED APPLICATION

This application is based upon and claims the benefit of priority of the prior Japanese Patent Application No. 2011-056874, filed on Mar. 15, 2011, the entire contents of which are incorporated herein by reference.

FIELD

The embodiments discussed herein are related to an optical receiving apparatus which performs coherent reception.

BACKGROUND

As volumes of Internet traffics are increased, optical communication networks having large capacity have been demanded. Therefore, a system having a signal transmission speed of 100 G (bit/s) or more per one wavelength has been developed.

However, when a signal transmission speed (bit rate) per one wavelength is increased, signal deterioration due to deterioration of OSNR (Optical Signal Noise Ratio) resistance and waveform distortion caused by a nonlinear effect such as wavelength dispersion or polarization mode dispersion is increased.

On the other hands, in recent years, a digital coherent receiver technology which is expected to improve the signal deterioration caused by the deterioration of the OSNR resistance or the waveform distortion has been attracting attention.

The coherent receiver technology is a reception technique which mixes a received optical signal and local oscillation light in a receiver with each other, extracting information on an electric field (a phase and an intensity of the light) of the received optical signal, converting the electric-field information of the light into an electric signal, and decodes the electric signal.

Furthermore, in the digital coherent receiver technology, an electric signal of the extracted electric-field information is quantized and converted into a digital signal by an A/D converter, and the digital signal is decoded by a digital signal process.

Use of the digital coherent receiver technology improves the OSNR resistance and waveform distortion resistance by performing compensation of the wavelength distortion through the digital signal process. Therefore, when compared with a general direct detection method, the digital coherent receiver technology may have excellent characteristics in terms of optical transmission in a large bit rate.

As the related art of the coherent reception, a technique of controlling a wavelength or a frequency of local oscillation light output from a local oscillator has been proposed (as for the related arts, refer to Japanese Laid-open Patent Publication Nos. 2010-109847 and 6-338856).

In the digital coherent receiver technology, control is performed such that a carrier frequency of a received optical signal and an oscillation frequency of local oscillation light oscillated by a local oscillator are made coincide with each other within a range of an allowable frequency difference.

Furthermore, the digital coherent receiver technique may be applied to a receiver included in an optical transmission system or the like which performs WDM (Wavelength Division Multiplexing) transmission by performing an Add (insertion)/Drop (branch) operation using arbitrary channels.

In such an optical transmission system, since the Add/Drop operation is performed using the wavelength channels, a wavelength of a transmitted optical signal, i.e., a carrier frequency is changed. In this case, if a difference between the carrier frequency of the optical signal and the oscillation frequency of the local oscillation light is within the range of the allowable frequency difference (pull-in range), both the frequencies are locked again and synchronized with each other. However, the frequency difference is out of the range of the allowable frequency difference, pull-in is not performed and loss of synchronization occurs, and accordingly, transmission quality is deteriorated.

SUMMARY

According to an aspect of the embodiment, there is provided an optical receiving apparatus, including: a receiver configured to perform coherent reception by mixing first light of a received optical signal and second light generated by a local oscillator; a monitor configured to monitor a first frequency of the first light; and a controller configured to control a second frequency of the second light, based on a difference between the first frequency and the second frequency so as to reduce the difference.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12 is a flowchart illustrating the operation.

DESCRIPTION OF EMBODIMENTS

Figure 1:
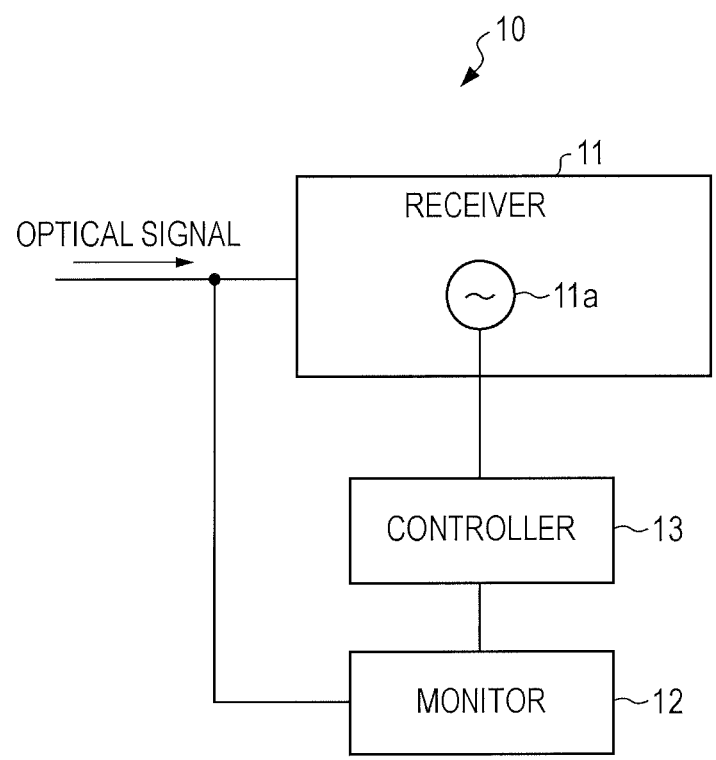
FIG. 1 is a diagram illustrating a configuration of an optical receiving apparatus.

Hereinafter, embodiments of the present disclosure will be described with reference to the accompanying drawings. FIG. 1 is a diagram illustrating a configuration of an optical receiving apparatus 10. The optical receiving apparatus 10 includes a receiver 11, an optical channel monitor 12, and a controller 13. The receiver 11 includes a local oscillator 11a and performs coherent reception by mixing an optical signal with local oscillation light which is oscillated by the local oscillator 11a. The optical channel monitor 12 monitors an optical signal frequency which is a frequency (carrier frequency) of the optical signal.

The controller 13 obtains a frequency correction amount using the optical signal frequency and the oscillation frequency of the local oscillator 11a. Then, the controller 13 corrects the oscillation frequency in accordance with the frequency correction amount and performs control of setting of the oscillation frequency so as to reduce a frequency difference between the optical signal frequency and the oscillation frequency (note that the frequency difference is also referred to as a "frequency offset" hereinafter).

In this way, the optical receiving apparatus 10 is configured such that the frequency correction amount is obtained using the monitored optical signal frequency and the oscillation frequency of the local oscillator 11a and the oscillation frequency is appropriately corrected in accordance with the frequency correction amount so that the frequency offset is reduced (corrected).

By this, the frequency offset may be efficiently corrected by making the oscillation frequency of the local oscillator 11a coincide with the optical signal frequency which changes in operation in a range of an allowable frequency difference. Accordingly, transmission quality may be improved.

Figure 2:
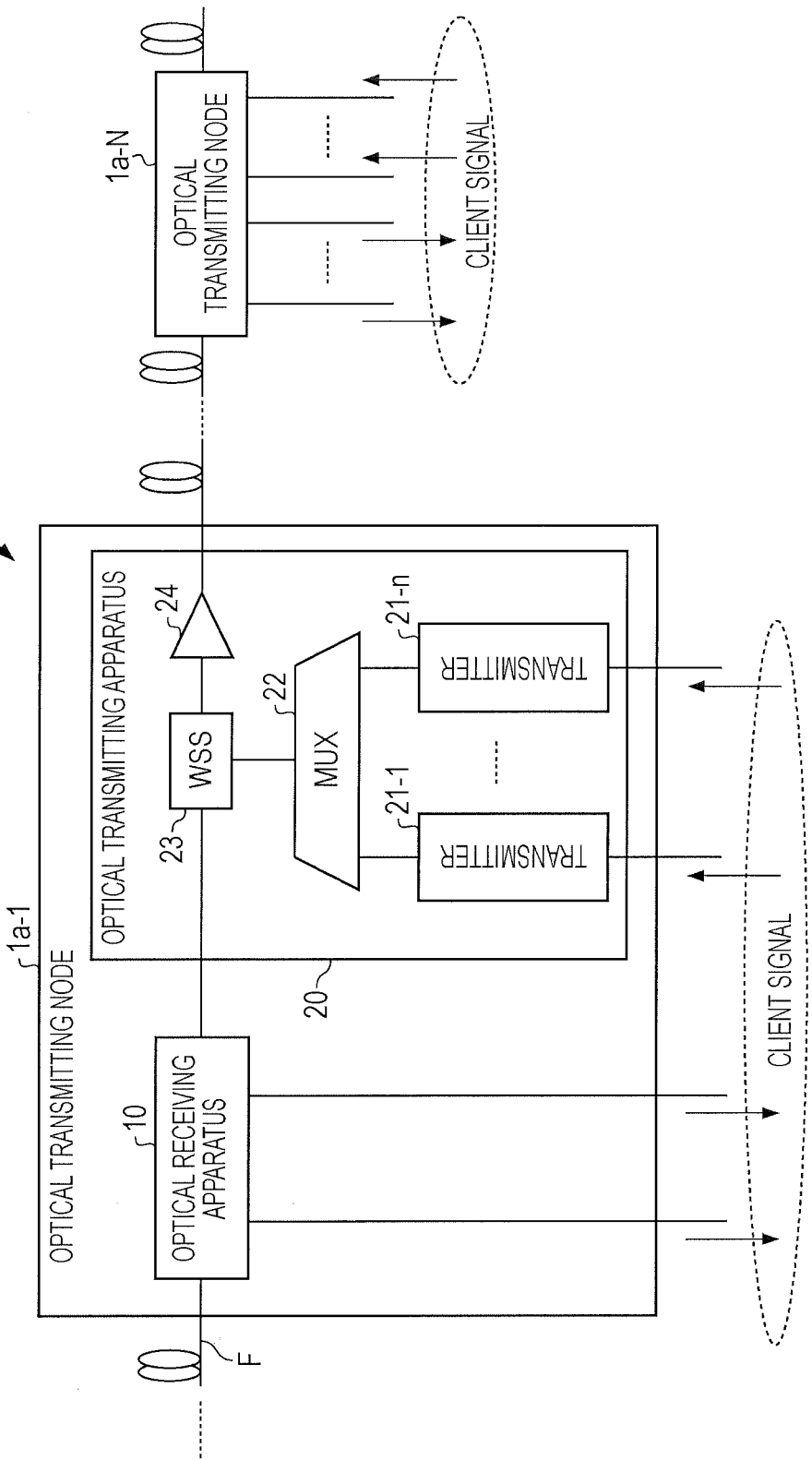
FIG. 2 is a diagram illustrating a configuration of an optical transmission system.

Next, an optical transmission system including the optical receiving apparatus 10 will be described. FIG. 2 is a diagram illustrating a configuration of an optical transmission system 1. The optical transmission system 1 includes optical transmitting nodes 1a-1 to 1a-N and performs WDM transmission by performing an Add/Drop operation on wavelength channels.

The optical transmitting nodes 1a-1 to 1a-N are connected to one another in series through an optical fiber transmission path F (WDM line). Each of the optical transmitting nodes 1a-1 to 1a-N includes the optical receiving apparatus 10 and an optical transmitting apparatus 20. The optical receiving apparatus 10 has a Drop function and the optical transmitting apparatus 20 has an Add function.

The optical transmitting apparatus 20 includes transmitters 21-1 to 21-n, a wavelength multiplexer 22, a WSS (Wavelength Selective Switch) 23, and a post-amplifier 24. Note that the optical receiving apparatus 10 includes the components described with reference to FIG. 1 (which will be described in detail hereinafter).

The optical receiving apparatus 10 receives a WDM optical signal supplied through the optical fiber transmission path F and drops the WDM optical signal to a tributary side or performs through output on the WDM line in accordance with a communication request.

In the optical transmitting apparatus 20, each of the transmitters 21-1 to 21-n receives a client signal transmitted from the tributary. When the client signal is an electric signal, the client signal is subjected to an E/O conversion so that an optical signal having a predetermined wavelength is generated. Furthermore, the wavelength multiplexer 22 performs wavelength division multiplexing on optical signals having respective wavelengths which are output from the transmitters 21-1 to 21-n.

The WSS 23 selects an optical signal having a certain wavelength from among the optical signals which have been subjected to the wavelength division multiplexing and performs wavelength multiplexing on the WDM optical signal supplied from the optical receiving apparatus 10 and the selected optical signal having the certain wavelength so as to newly generate a WDM optical signal. The post-amplifier 24 amplifies the WDM optical signal output from the WSS 23 and outputs the WDM optical signal to a node in a next stage through the optical fiber transmission path F.

Here, generation of the frequency offset will be described. Specifically, when simple exponentiation is used as a reception algorithm (a fourth-power method is employed when QPSK (Quadrature Phase Shift Keying) is used), the allowable frequency difference (pull-in range) is obtained by ±symbol rate/8 when the frequency of the received optical signal and the oscillation frequency of the local oscillation light coincide with each other.

For example, in a case of OTU4 (Optical channel Transport Unit 4), transmission is performed in a unit of a stream of 111.8 Gbps, and therefore, a symbol rate of the OTU4 is 111.8/4. Furthermore, an allowable frequency difference is obtained by dividing 111.8/4 by 8, that is, the allowable frequency difference is approximately ±3.5 GHz. Specifically, when the frequency offset which is the difference between the two frequencies is within a range of ±3.5 GHz, pull-in may be performed and the frequencies may be locked.

On the other hand, in the WDM transmission, since reliability of an oscillation frequency of a commercially-used light source is approximately ±2.5 GHz when a general wavelength multiplexing light source is used, a difference of ±2.5 GHz is obtained in a transmission side and a difference of ±2.5 GHz is obtained in a reception side. Accordingly, a frequency offset of the entire system is a range of ±5.0 GHz.

Figure 3:
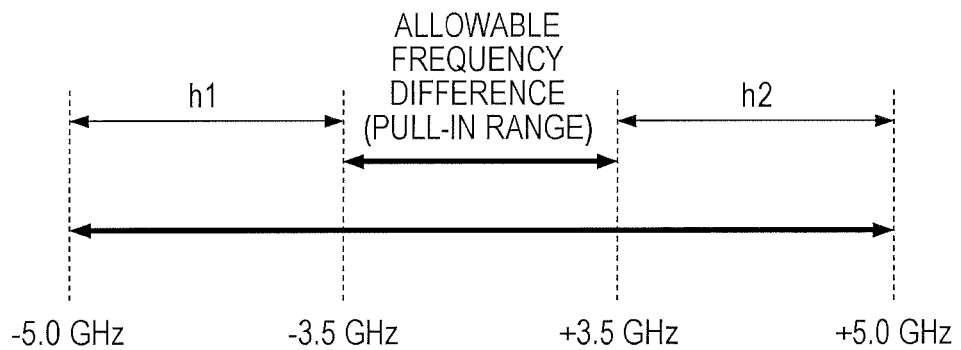
FIG. 3 is a diagram illustrating an allowable frequency difference.

FIG. 3 is a diagram illustrating the allowable frequency difference. The frequency offset generated in the system when the commercially-used light source is used is in a range from a lower limit of −5 GHz to an upper limit of +5 GHz, that is, a range from ±5 GHz. Furthermore, the allowable frequency difference is in a range from a lower limit of −3.5 GHz to an upper limit of +3.5 GHz, that is, a range from ±3.5 GHz.

Accordingly, it is likely that the frequency offset generated in the system reaches ranges h1 and h2, and in this case, the frequency offset is out of the range of the allowable frequency difference where the frequency offset can be adjusted. Therefore, the pull-in is not performed and loss of synchronization occurs.

Furthermore, when wavelength change (change of a transmission route) is performed due to the Add/Drop operation during operation of the system, an optical signal which has a certain wavelength and which has been transmitted is changed to an optical signal having another wavelength, and accordingly, the wavelength (frequency) of the optical signal is changed. Then a setting point of the oscillation frequency of the local oscillation light which has been controlled so as to coincide with the frequency of the optical signal is changed.

It is assumed that an optical signal having a certain wavelength which is subjected to an Add operation performed by the optical transmitting apparatus 20 included in the optical transmitting node 1a-1 illustrated in FIG. 2 is received by a receiver included in the optical transmitting node in the next state. In this state, when a wavelength change occurs such that an optical signal which has been subjected to the Add operation is changed to a through optical signal in the optical transmitting node 1a-1, a setting point of the oscillation frequency of the local oscillation light generated on the optical transmitting node side in the next state may be changed. An amount of change of the setting point is 5.0 GHz at maximum according to the reliability of the oscillation frequency of the local oscillator, and accordingly, a frequency offset may be out of the pull-in range.

This technique has been made in view of this point, and provides an optical receiving apparatus which corrects a frequency difference by appropriately controlling a setting of an oscillation frequency of a local oscillator even when a frequency of an optical signal is changed so as to improve transmission quality.

First Embodiment

Figure 4:
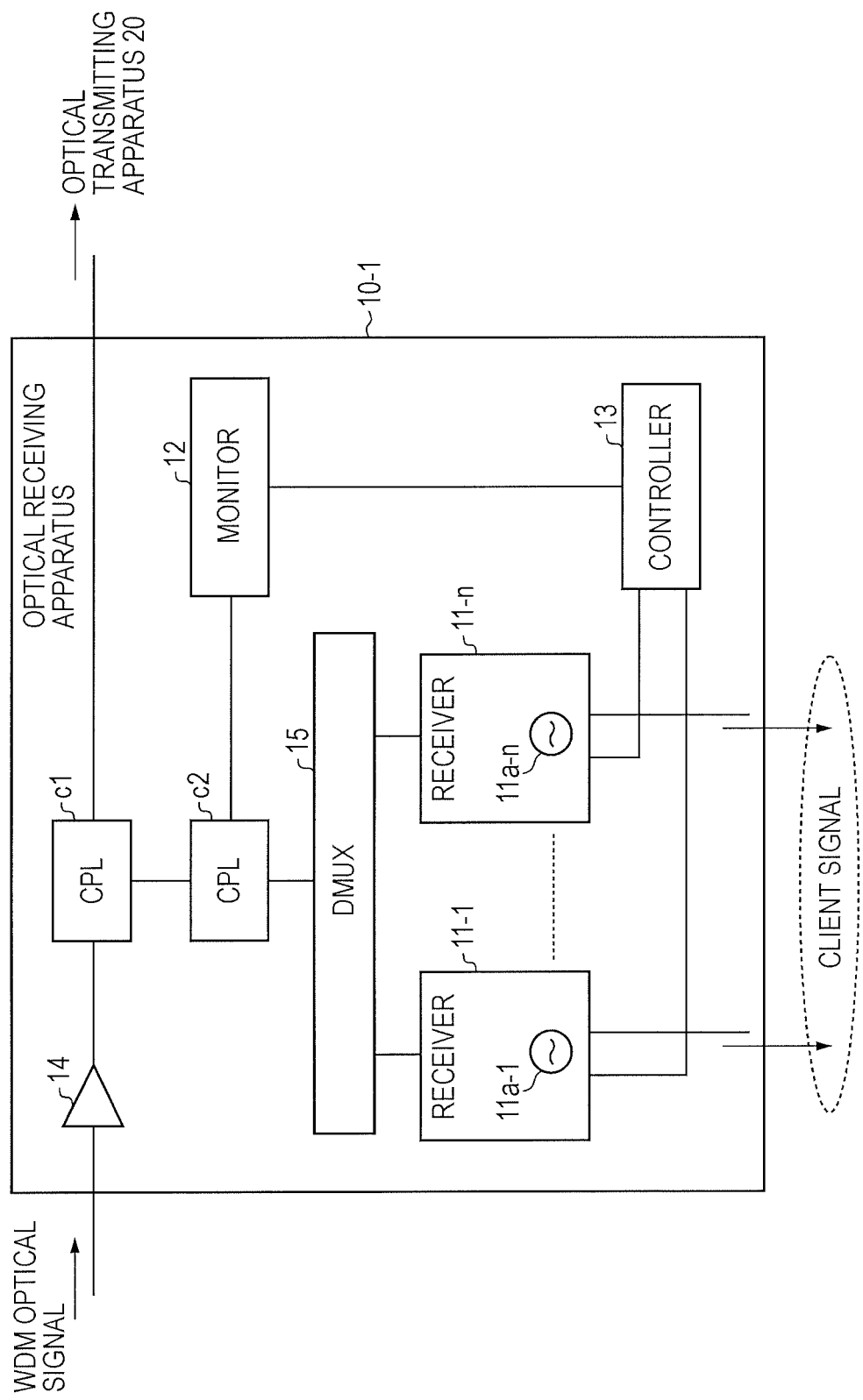
FIG. 4 is a diagram illustrating the configuration of the optical receiving apparatus in detail.

Next, a configuration and operation of the optical receiving apparatus 10 will be described in detail hereinafter. FIG. 4 is a diagram illustrating the configuration of the optical receiving apparatus 10 in detail. An optical receiving apparatus 10-1 includes receivers 11-1 to 11-n, an optical channel monitor (OCM: Optical Channel Monitor) 12, a controller 13, a pre-amplifier 14, a wavelength de-multiplexer 15, and couplers c1 and c2.

The pre-amplifier 14 receives and amplifies a WDM optical signal. The coupler c1 branches the amplified WDM optical signal into two. One of the branched WDM optical signals is supplied to the optical transmitting apparatus 20 and the other is supplied to the coupler c2.

The coupler c2 branches the received WDM optical signal into two. One of the branched WDM optical signals is supplied to the optical channel monitor 12 and the other is supplied to the wavelength de-multiplexer 15. The wavelength de-multiplexer 15 performs wavelength de-multiplexing on the received WDM optical signal and transmits optical signals having various wavelengths to the receivers 11-1 to 11-n. For example, a WDM optical signal having different wavelengths of $\lambda 1$ to $\lambda n$ which are multiplexed is subjected to wavelength de-multiplexing and resultant optical signals having wavelengths of $\lambda 1$ to $\lambda n$ are supplied to the receivers 11-1 to 11-n, respectively.

The receivers 11-1 to 11-n include respective local oscillators 11a-1 to 11a-n and perform a digital coherent reception process on the received optical signals so as to generate client signals to be output.

When receiving the WDM optical signal obtained through the branching performed by the coupler c2, the optical channel monitor 12 monitors frequencies (wavelengths) of the optical signal having different wavelengths and outputs results of the monitoring. The controller 13 obtains frequency correction amounts in accordance with oscillation frequencies which have been currently set and the monitored optical signal frequencies for the local oscillators 11a-1 to 11a-n included in the corresponding receivers 11-1 to 11-n. Thereafter, the oscillation frequencies of the local oscillators 11a-1 to 11a-n included in the receivers 11-1 to 11-n are set so that frequency offsets are reduced.

Figure 5:
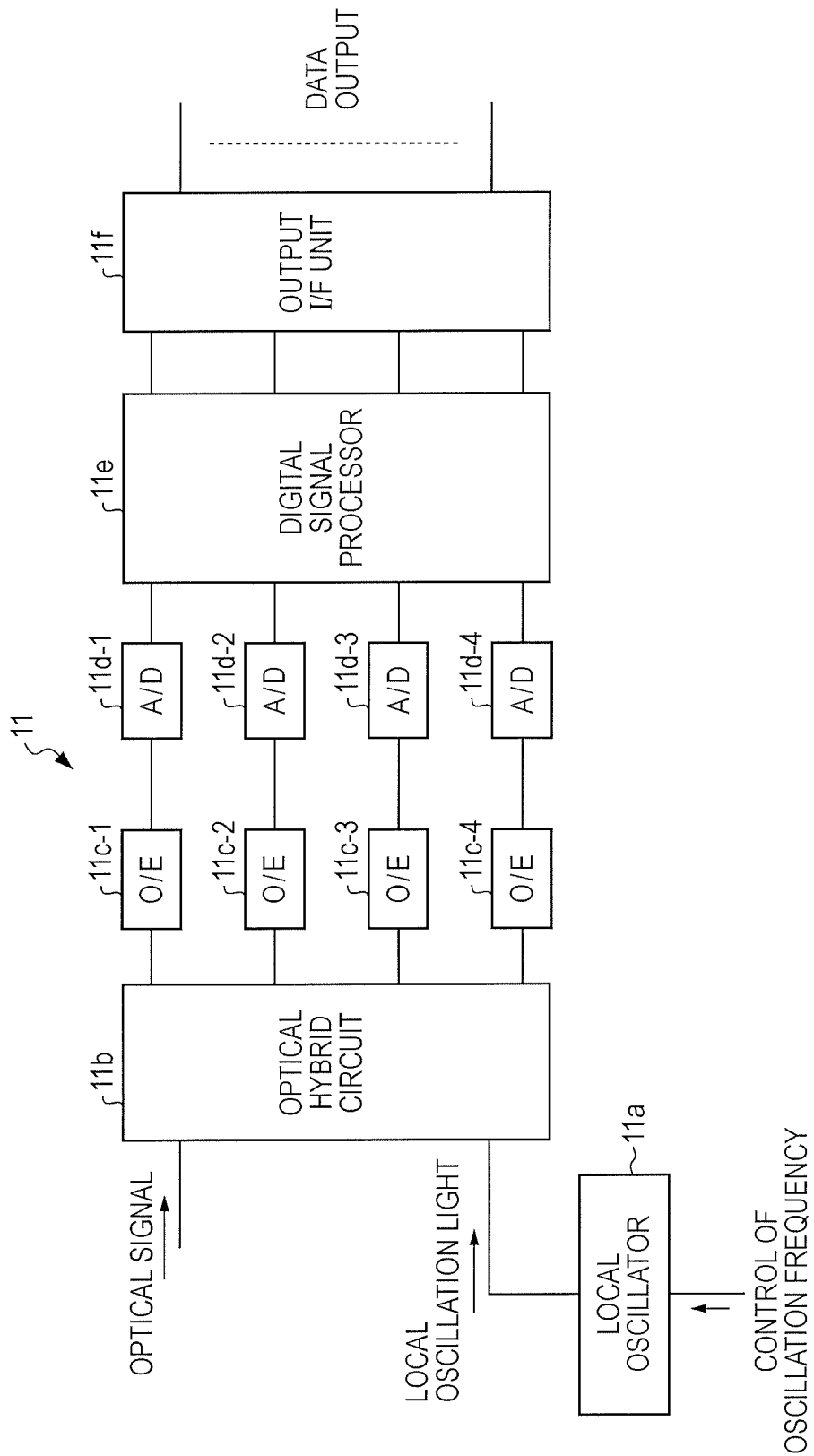
FIG. 5 is a diagram illustrating a configuration of a receiver.

Next, internal configurations of the receivers 11-1 to 11-n will be described. FIG. 5 is a diagram illustrating a configuration of the receiver 11. The receiver 11 includes the local oscillator 11a, an optical hybrid circuit 11b, O/E units 11c-1 to 11c-4, A/D converters 11d-1 to 11d-4, a digital signal processor 11e, and an output I/F (interface) 11f.

When the controller 13 performs the oscillation frequency setting control, the local oscillator 11a sets the oscillation frequency variable and outputs the local oscillation light. The optical hybrid circuit 11b mixes the optical signal supplied from the wavelength de-multiplexer 15 and the local oscillation light with each other and outputs a baseband signal corresponding to electric field information of the optical signal (a phase and an intensity of light).

The O/E units 11c-1 to 11c-4 convert the baseband signal serving as the electric field information into an analog electric signal. The A/D converters 11d-1 to 11d-4 quantize the analog signal including the electric field information at a sampling timing in a predetermined sampling clock and convert the analog signal into a digital signal to be output.

The digital signal processor 11e receives the digital signal and performs detection by a digital signal process so as to decode the digital signal. The output I/F 11f performs an output interface process and outputs data (client signal).

Here, in the digital coherent detection, it is important that the frequency of the received optical signal coincides with the oscillation frequency of the local oscillation light within the range of the allowable frequency difference. When both the frequencies coincide with each other, the received optical signal and the local oscillation light interfere with each other in the optical hybrid circuit 11b. When phases of the frequencies coincide with each other, the phases reinforce each other and 1 is obtained whereas when the phases are different from each other by n, the phases attenuate each other and 0 is obtained, and accordingly the baseband signal is output from the optical hybrid circuit 11b.

As described above, in the digital coherent detection, detection is performed using a baseband signal generated by interference between a received optical signal and local oscillation light which have frequencies which coincide with each other (this detection method is referred to as "homodyne detection").

Figure 6:
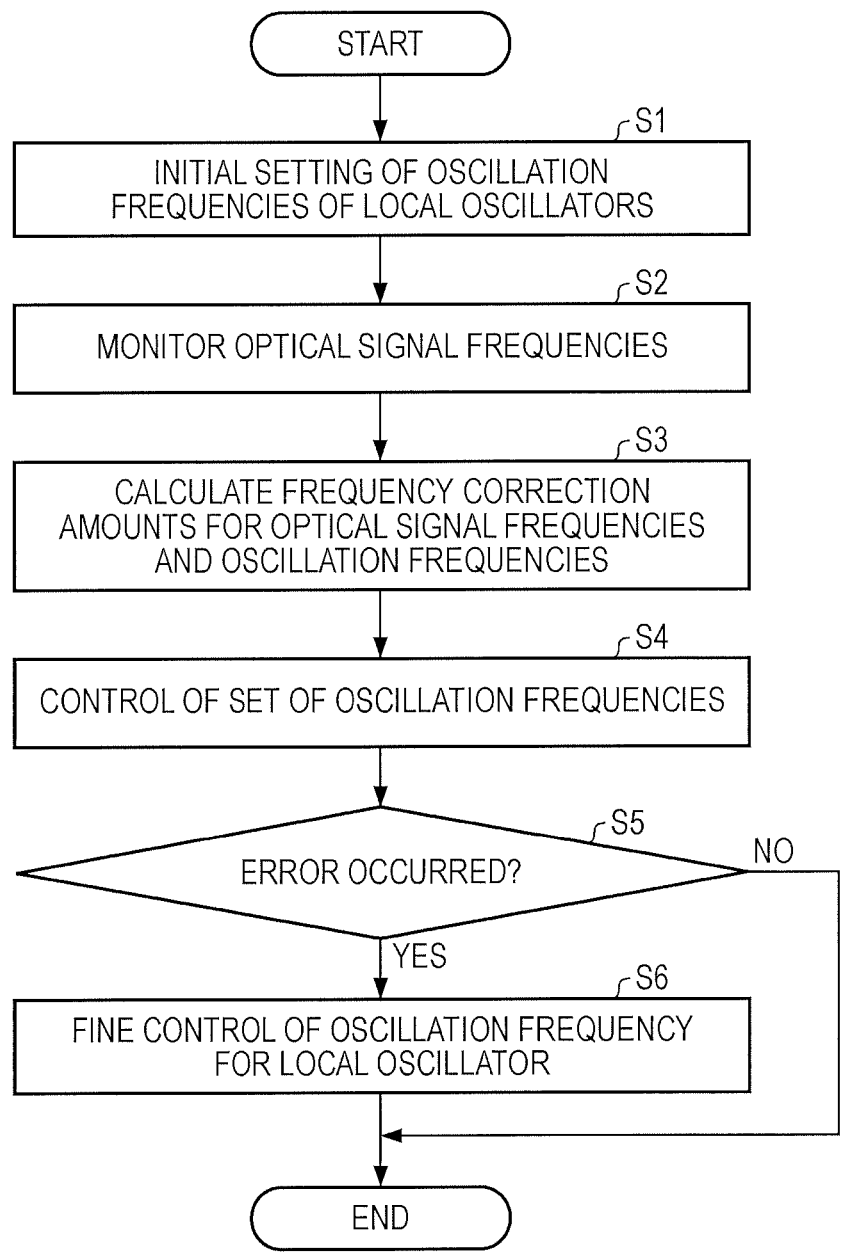
FIG. 6 is a flowchart illustrating an operation.

Next, operation of the optical receiving apparatus 10-1 will be described with reference to a flowchart. FIG. 6 is a flowchart illustrating the operation.

(Operation S1) The controller 13 sets predetermined oscillation frequencies (f1 to fn) to the local oscillators 11a-1 to 11a-n included in the receivers 11-1 to 11-n at a time of initial operation.

(Operation S2) The optical channel monitor 12 receives a WDM optical signal which is subjected to the Drop operation performed by the coupler c1 and the branching performed by the coupler c2, monitors frequencies (optical signal frequencies) of the optical signal having various wavelengths, and transmits results of the monitoring to the controller 13.

(Operation S3) The controller 13 compares information on the oscillation frequencies (f1 to fn) set in the local oscillators 11a-1 to 11a-n with optical signal frequencies (O1 to On) which are currently monitored so as to obtain frequency correction amounts ($\alpha 1$ to $\alpha n$) serving as difference values ($\alpha k = Ok - fk$). Then, the frequency correction amounts are stored in an internal memory as correction amounts for the receivers 11-1 to 11-n. For example, the following expression is satisfied: the frequency correction amounts ($\alpha 1$ to $\alpha n$)= (O1-f1 to On-fn).

(Operation S4) The controller 13 adds the frequency correction amounts to the values of the oscillation frequencies set in the local oscillators 11a-1 to 11a-n in the initial operation and sets oscillation frequencies obtained after the addition (after correction) to the local oscillators 11a-1 to 11a-n.

(Operation S5) The controller 13 checks error states of the receivers 11-1 to 11-n after performing the control in operation S4. For example, when an alarm signal such as an LOS (Loss Of Signal) or an LOF (Loss Of Frame) is generated from digital signal processors 11e or the like included in the receivers 11-1 to 11-n, the controller 13 recognizes that an error such as loss of synchronization has occurred. Alternatively, the controller 13 may recognize an error using FEC (Forward Error Correction) count information or the like.

(Operation S6) When an error has occurred in one of the receivers 11-1 to 11-n (it is assumed that an error has occurred in the receiver 11-1), the controller 13 performs fine control of the oscillation frequency setting on the local oscillator 11a-1. In this case, the controller 13 sweeps the oscillation frequency set in operation S4 in a predetermined range so as to check whether the error is removed and set a frequency value obtained when the error is removed to the local oscillator 11a-1.

Here, the operation in operation S6 will be described in detail. It is assumed that an allowable frequency difference of the receivers 11-1 to 11-n is denoted by "A", oscillation frequency reliability of the local oscillation light of the local oscillators 11a-1 to 11a-n is denoted by "B", and monitor reliability of the optical channel monitor 12 is denoted by "C".

In this case, when a condition "A≥B+C" is satisfied, the oscillation frequencies of the local oscillators 11a-1 to 11a-n may be appropriately set in accordance with the control flow performed until operation S4 (that is, the frequency offset between the optical signal frequency and the oscillation frequencies may be set within the allowable frequency difference). Accordingly, since all the receivers 11-1 to 11-n are synchronized with each other, normal signal communication may be performed.

On the other hand, a case where the condition "A≥B+C" is not satisfied will be described. It is assumed that 3.5 GHz is assigned to A (when exponentiation employing the QPSK method and an OTU4 rate are used) and 2.5 GHz is assigned to B (frequency reliability of the commercially-used local oscillator).

In this case, the monitor reliability which is appropriate for the optical channel monitor 12 is expressed by the following expression: (A−B)=(3.5−2.5)≥C, and therefore, the value C is equal to or smaller than 1.0 GHz. Therefore, when the monitor reliability is equal to or smaller than 1.0 GHz, problem does not arise. However, when the monitor reliability is 1.25 GHz, insufficient reliability of 0.25 GHz occurs.

If the insufficient reliability occurs in the optical channel monitor 12, the frequency offset between the optical signal frequency and the oscillation frequencies may not be set using the oscillation frequencies obtained after the correction and calculated in operation S4. Therefore, when the insufficient reliability occurs in the optical channel monitor 12, a process from operation S5 onwards is performed taking the insufficient reliability into consideration.

Specifically, after the error is recognized, an insufficient reliability amount D of the optical channel monitor 12 is obtained in advance provided that the following expression is satisfied: D=±(B+C−A). Therefore, the oscillation frequencies are swept in a range from insufficient reliability amounts −D to +D using the oscillation frequencies set once in operation S4 as references. Then, after the error included in the receiver 11-1 is cleared, an oscillation frequency obtained when the error is cleared is set to the local oscillator 11a-1.

As described above, by performing the control in the process from operation S1 to operation S4, even when the frequency of the optical signal is changed, the oscillation frequency of the local oscillator may be appropriately set while the allowable frequency difference of the local oscillator is reliably satisfied. Accordingly, the frequency offset may be corrected and the transmission quality may be improved.

Furthermore, the controller 13 is configured, by performing the control in operation S5 and operation S6, when the error supplied from the receiver 11 is recognized, to finely control the oscillation frequency in accordance with the insufficient reliability amount of the optical channel monitor 12 and control setting of the oscillation frequency to the local oscillator.

With this configuration, even when the reliability of the optical channel monitor 12 is insufficient, the oscillation frequency of the local oscillator may be set with high reliability and the correction of the frequency offset may be performed so that the allowable frequency difference of the local oscillator is reliably satisfied.

Note that, it is assumed that, in the optical receiving apparatus 10-1, the optical channel monitor 12 recognizes a receiver which has not been subjected to the Drop operation from a WDM line while monitoring an optical signal of a Drop wavelength. In this case, the controller 13 performs control such that a power of a local oscillator included in the receiver is disconnected in accordance with a result of the monitoring. Since the electric power of the local oscillator of the receiver which has not been performing a reception operation is disconnected, low power consumption may be realized.

Second Embodiment

Figure 7:
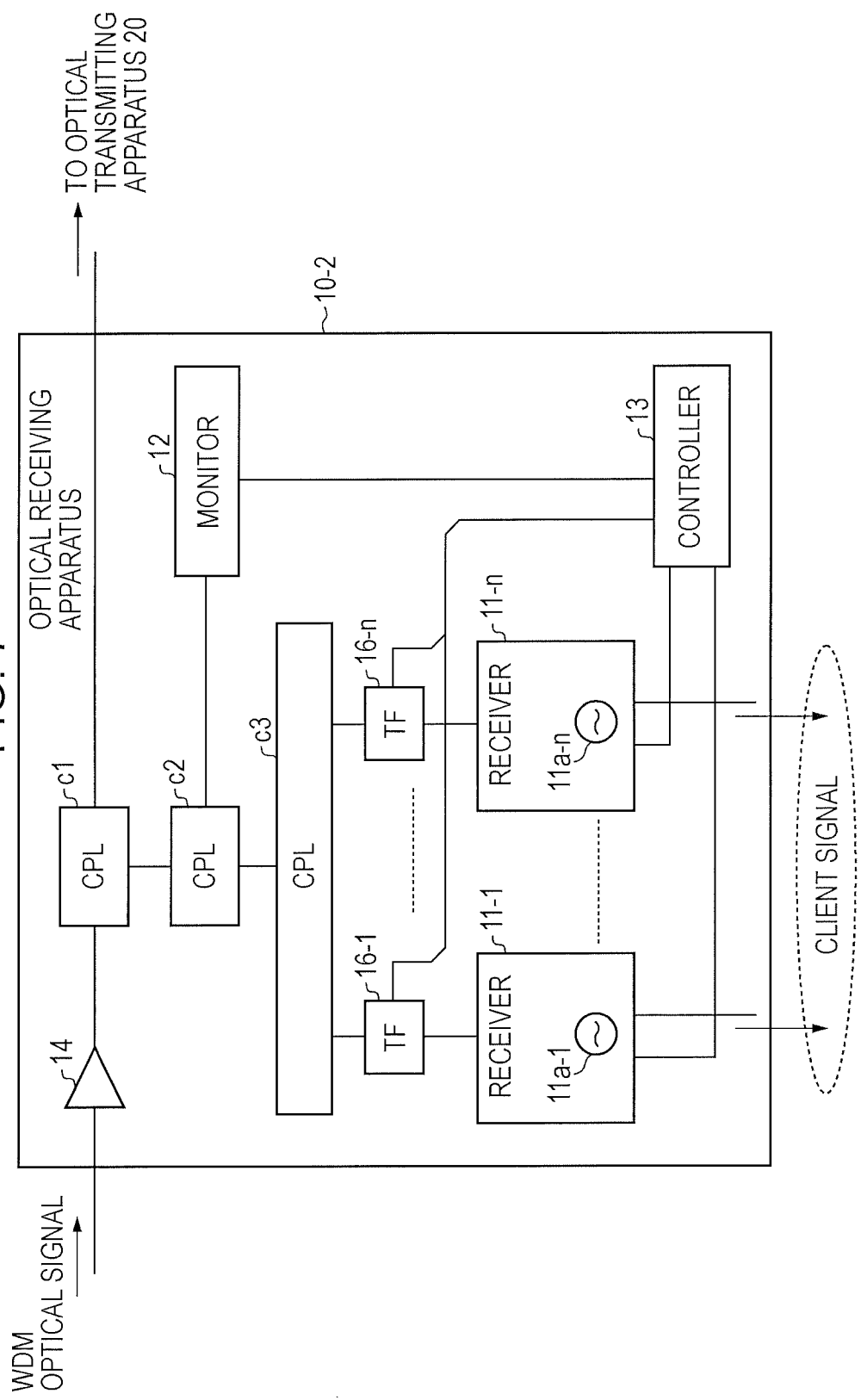
FIG. 7 is a diagram illustrating another configuration of the optical receiving apparatus.

Next, another embodiment of the optical receiving apparatus 10 will be described. FIG. 7 is a diagram illustrating anther configuration of the optical receiving apparatus 10. An optical receiving apparatus 10-2 includes receivers 11-1 to 11-n, an optical channel monitor 12, a controller 13, a preamplifier 14, tunable filters 16-1 to 16-n, and couplers c1 to c3.

The optical receiving apparatus 10-2 is mainly different from the optical receiving apparatus 10-1 illustrated in FIG. 4 in that the wavelength de-multiplexer 15 is replaced by the coupler c3 which has one input and n branching outputs and the tunable filters 16-1 to 16-n are additionally included.

The coupler c3 branches a WDM optical signal output from the coupler c2 into n paths and outputs branched WDM optical signals. The tunable filters 16-1 to 16-n receive the respective WDM optical signals which have been branched and allow optical signals having predetermined wavelengths to be transmitted in accordance with respective transmission wavelength filtering instructions supplied from the controller 13.

For example, when transmission wavelength filtering instructions corresponding to wavelengths of λ1 to λn are supplied to the tunable filters 16-1 to 16-n, the tunable filter 16-1 allows an optical signal having the wavelength of λ1 to be transmitted and outputs the optical signal, and similarly, the tunable filter 16-n allows an optical signal having the wavelength of λn to be transmitted and outputs the optical signal.

Figure 8:
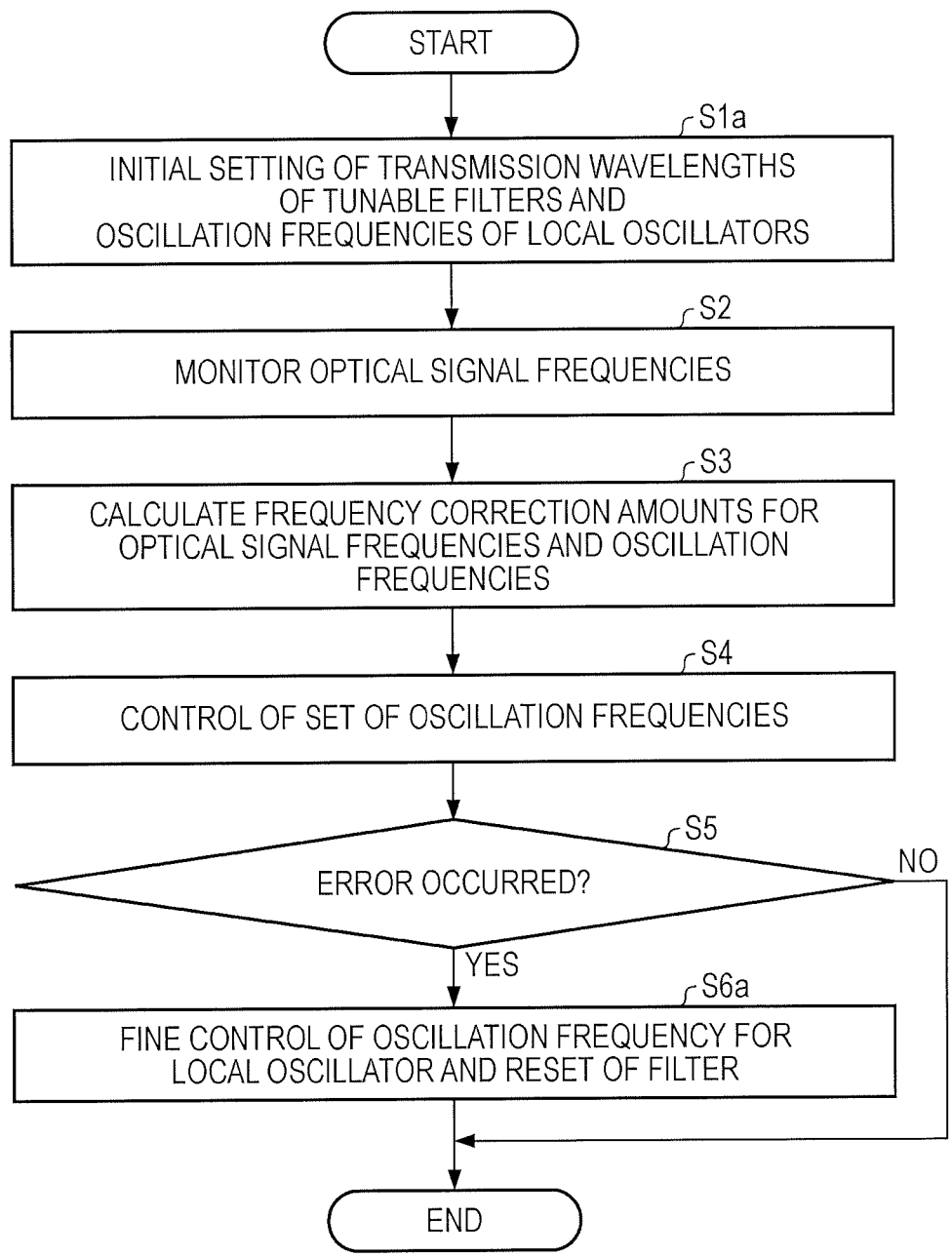
FIG. 8 is a flowchart illustrating an operation.

Next, operation of the optical receiving apparatus 10-2 will be described with reference to a flowchart. FIG. 8 is a flowchart illustrating the operation.

(Operation S1a) The controller 13 performs transmission wavelength filtering setting on the tunable filters 16-1 to 16-n at a time of initial operation. Furthermore, the controller 13 sets predetermined oscillation frequencies (f1 to fn) to local oscillators 11a-1 to 11a-n included in the receivers 11-1 to 11-n at a time of initial operation.

(Operation S2) The optical channel monitor 12 receives a WDM optical signal which is generated by the Drop operation performed by the coupler c1 and the branching performed by the coupler c2, monitors frequencies (optical signal frequencies) of the optical signal having various wavelengths, and transmits results of the monitoring to the controller 13.

(Operation S3) The controller 13 compares information on the oscillation frequencies (f1 to fn) set in the local oscillators 11a-1 to 11a-n with optical signal frequencies (O1 to On) which are currently set and monitored so as to obtain frequency correction amounts (α1 to αn) serving as difference values (αk=Ok−fk). Then, the frequency correction amounts are stored in an internal memory as correction amounts for the receivers 11-1 to 11-n.

(Operation S4) The controller 13 adds the frequency correction amounts to the values of the oscillation frequencies set in the local oscillators 11a-1 to 11a-n in the initial operation and sets oscillation frequencies obtained after the addition (after correction) to the local oscillators 11a-1 to 11a-n.

(Operation S5) The controller 13 confirms error states of the receivers 11-1 to 11-n after performing the control in operation S4.

(Operation 6a) When an error has occurred in one of the receivers 11-1 to 11-n (it is assumed that an error has occurred in the receiver 11-1), the controller 13 performs fine control of the oscillation frequency setting on the local oscillator 11a-1. In this case, the controller 13 sweeps the oscillation frequency set in operation S4 in a predetermined range so as to check whether the error is removed and set a frequency value obtained when the error is removed to the local oscillator 11a-1. Note that, when the frequency of the local oscillator 11a-1 is corrected, the wavelength setting of the tunable filter 16-1 is simultaneously changed (that is, the tunable filter 16-1 is reset using a wavelength corresponding to the finely-controlled oscillation frequency).

As described above, with the configuration of the optical receiving apparatus 10-2, a wavelength-independent (colorless) system may be realized and transmission which flexibly responds to a dynamic change of a signal wavelength may be performed.

Figure 9:
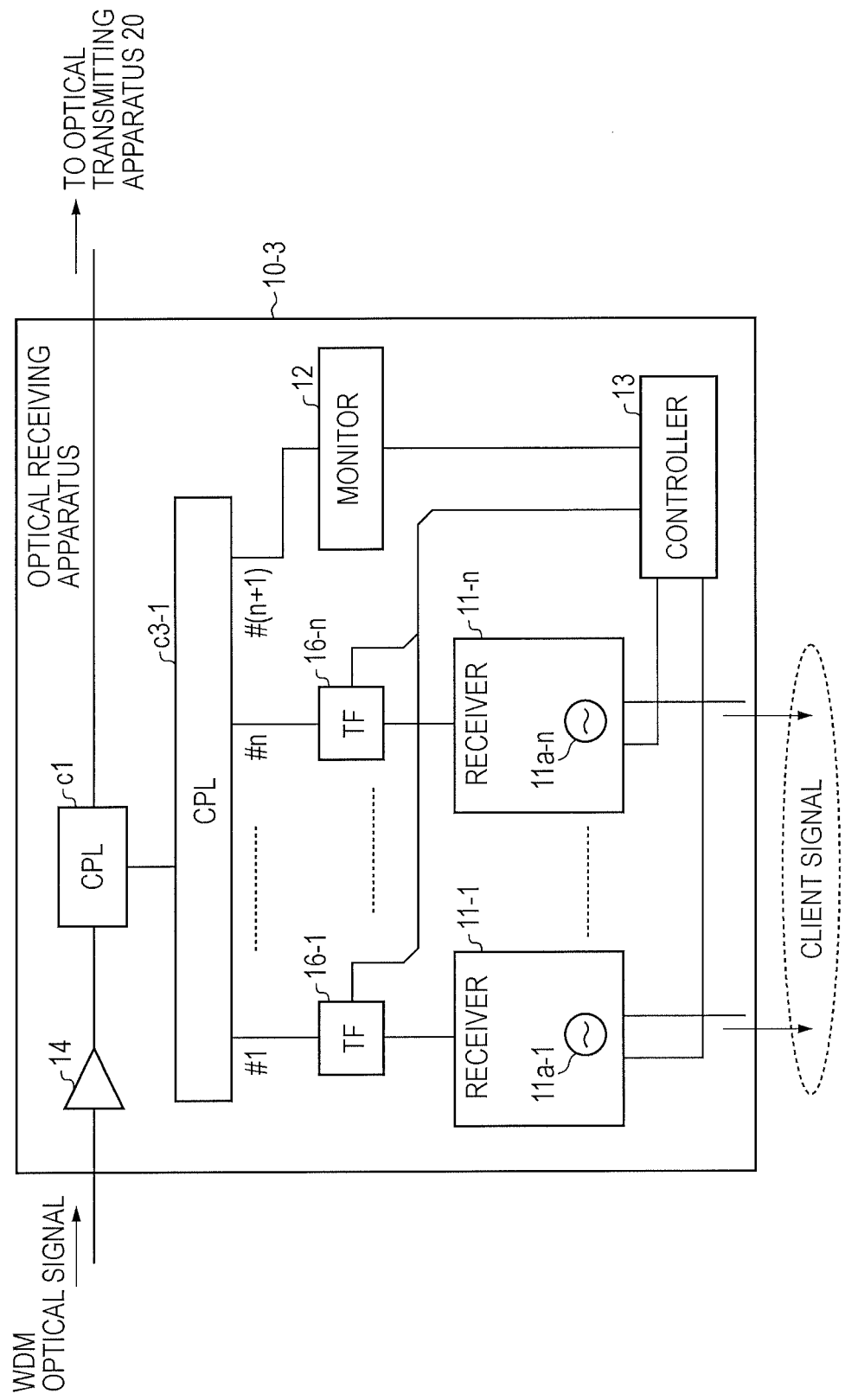
FIG. 9 is a diagram illustrating still another configuration of the optical receiving apparatus.

Next, still another embodiment of the optical receiving apparatus 10 will be described. FIG. 9 is a diagram illustrating still another configuration of the optical receiving apparatus 10. An optical receiving apparatus 10-3 includes receivers 11-1 to 11-n, an optical channel monitor 12, a controller 13, a pre-amplifier 14, tunable filters 16-1 to 16-n, and couplers c1 and c3-1.

The optical receiving apparatus 10-3 is mainly different from the optical receiving apparatus 10-2 illustrated in FIG. 7 in that the coupler c2 is removed, the coupler c3 is replaced by a coupler c3-1 which has one input and (n+1) outputs, and one of output terminals of the coupler c3-1 and an input terminal of the optical channel monitor 12 are connected to each other.

The coupler c3-1 branches a WDM optical signal output from the coupler c1 into (n+1) paths and outputs branched WDM optical signals. The branch paths 1 to n are connected to the tunable filters 16-1 to 16-n, respectively, and the branch path (n+1) is connected to the input terminal of the optical channel monitor 12. As described above, by connecting one of the output terminals of the coupler c3-1 and the input terminal of the optical channel monitor 12 to each other, the coupler c2 illustrated in FIG. 7 may be removed and an implementation size may be reduced.

Third Embodiment

Figure 10:
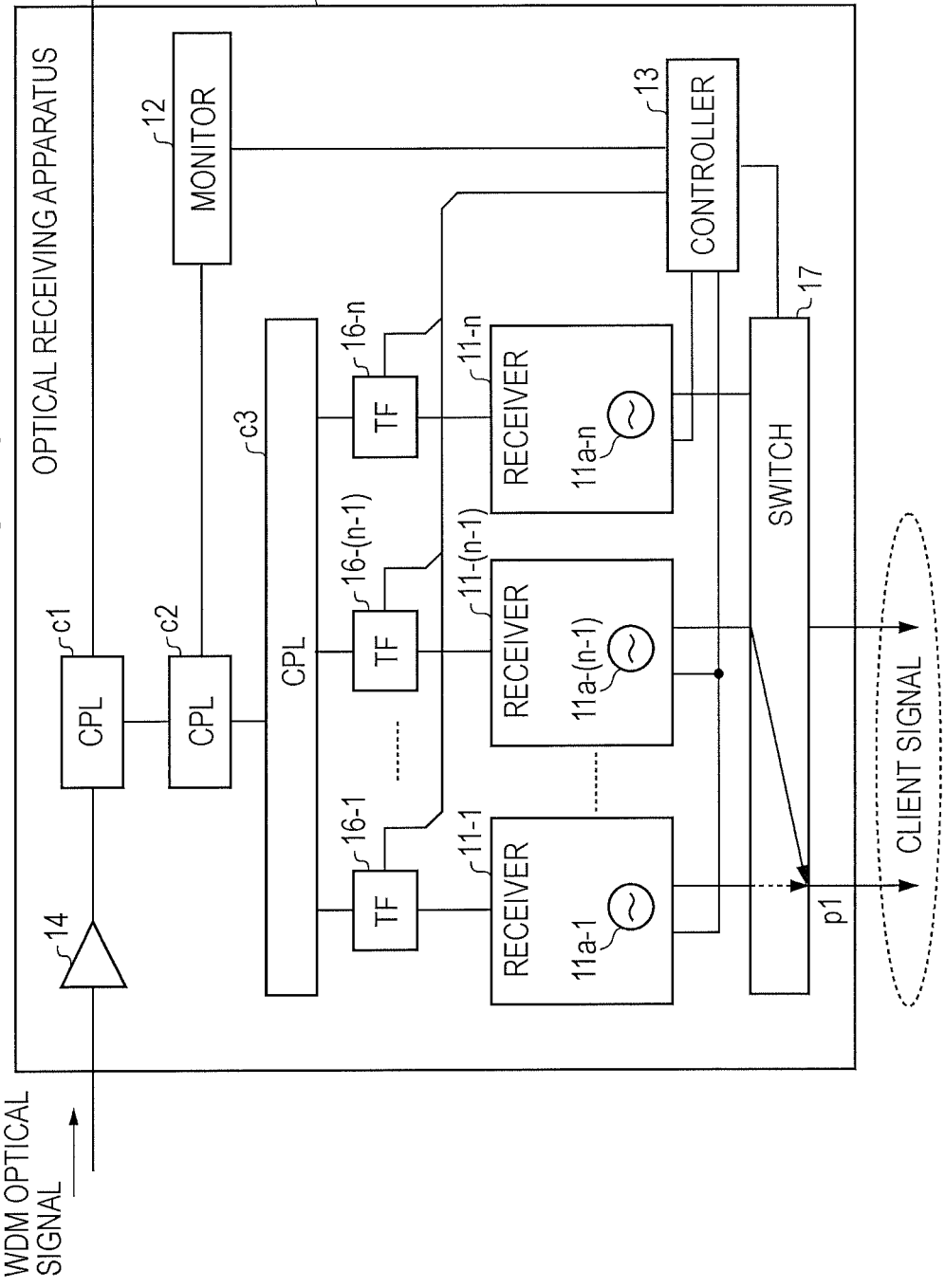
FIG. 10 is a diagram illustrating a further configuration of the optical receiving apparatus.

Next, a further embodiment of the optical receiving apparatus 10 will be described. FIG. 10 is a diagram illustrating a further configuration of the optical receiving apparatus 10. An optical receiving apparatus 10-4 includes receivers 11-1 to 11-n, an optical channel monitor 12, a controller 13, a pre-amplifier 14, tunable filters 16-1 to 16-n, couplers c1 to c3, and a switch 17.

The optical receiving apparatus 10-4 is mainly different from the optical receiving apparatus 10-2 illustrated in FIG. 7 in that the switch 17 which performs switching of signals output from the receivers 11-1 to 11-n is additionally provided. The switch 17 switches signals output from the receivers 11-1 to 11-n to predetermined ports in accordance with a switching instruction issued by the controller 13.

Figure 11:
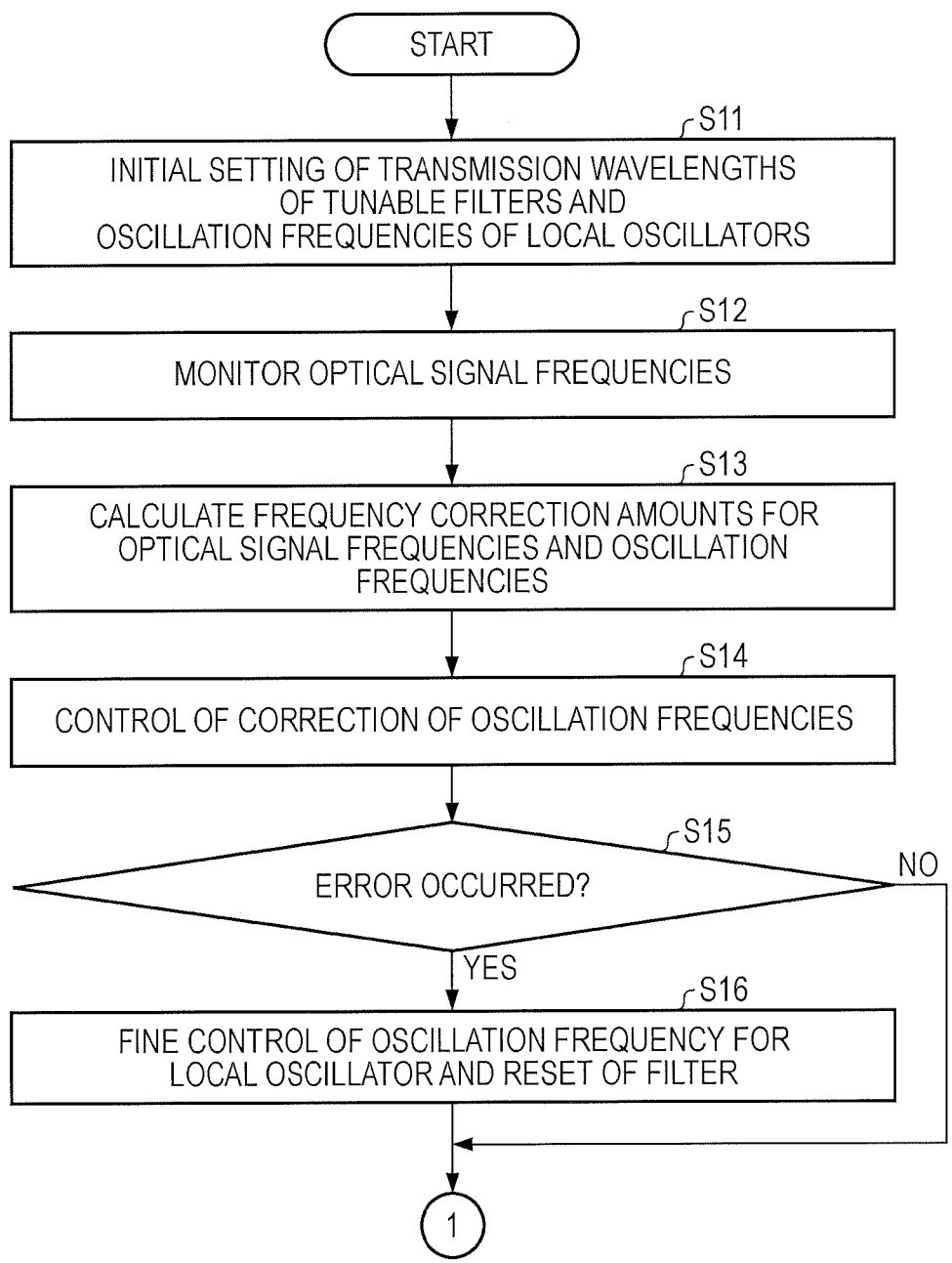
FIG. 11 is a flowchart illustrating an operation.

Next, operation of the optical receiving apparatus 10-4 will be described with reference to a flowchart. FIGS. 11 and 12 are flowcharts illustrating an operation. Note that a description will be made hereinafter assuming that the receivers 11-1 to 11-(n−1) operate and the receiver 11-n is used as a spare (unused) receiver.

(Operation S11) The controller 13 performs transmission wavelength filtering setting on the tunable filters 16-1 to 16-(n−1) at a time of initial operation. Furthermore, the controller 13 sets predetermined oscillation frequencies (f1 to f(n−1)) to local oscillators 11a-1 to 11a-(n−1) included in the receivers 11-1 to 11-(n−1).

(Operation S12) The optical channel monitor 12 receives a WDM optical signal which is generated by the Drop operation performed by the coupler c1 and the branching performed by the coupler c2, monitors frequencies (optical signal frequencies) of the optical signal having various wavelengths, and transmits results of the monitoring to the controller 13.

(Operation S13) The controller 13 compares information on the oscillation frequencies (f1 to f(n−1)) set in the local oscillators 11a-1 to 11a-(n−1) with optical signal frequencies (O1 to O(n−1)) which are currently monitored so as to obtain frequency correction amounts ($\alpha$1 to $\alpha$(n−1)) serving as difference values ($\alpha$k=Ok−fk). Then, the frequency correction amounts ($\alpha$1 to $\alpha$(n−1)) are stored in an internal memory as correction amounts for the receivers 11-1 to 11-(n−1).

(Operation S14) The controller 13 adds the frequency correction amounts to the value of the oscillation frequencies set in the local oscillators 11a-1 to 11a-(n−1) in the initial operation and sets oscillation frequencies obtained after the addition (after correction) to the local oscillators 11a-1 to 11a-(n−1).

(Operation S15) The controller 13 confirms error states of the receivers 11-1 to 11-(n−1) after performing the control in operation S14.

(Operation 16) When an error has occurred in one of the receivers 11-1 to 11-n (it is assumed that an error has occurred in the receiver 11-1), the controller 13 performs fine control of the oscillation frequency setting on the local oscillator 11a-1. In this case, the controller 13 sweeps the oscillation frequency set in operation S14 in a predetermined range of so as to check whether the error is removed and set a frequency value obtained when the error is removed to the local oscillator 11a-1. Note that, when the frequency of the local oscillator 11a-1 is corrected, the wavelength setting of the tunable filter 16-1 is simultaneously changed (that is, the tunable filter 16-1 is reset using a wavelength corresponding to the finely-controlled oscillation frequency).

(Operation S17) The controller 13 performs error (failure) detection on the receivers 11-1 to 11-(n−1). For example, the controller 13 monitors alarms transmitted from the components (the local oscillators 11a-1 to 11a-(n−1), A/D converters, DSPs, and the like) and checks error generation states.

(Operation S18) When detecting an error receiver in which an error has occurred, the controller 13 specifies a spare receiver (receiver which is not currently used) with reference to the results of the wavelength monitor performed by the optical channel monitor 12. Here, it is assumed that an error has occurred in the receiver 11-1 which receives an optical signal having a wavelength of $\lambda$1 and the receiver 11-n is used as the spare receiver.

(Operation S19) The controller 13 sets filtering corresponding to a transmission wavelength of $\lambda$1 to the tunable filter 16-n. Furthermore, the controller 13 sets an oscillation frequency to the local oscillator 11a-n included in the receiver 11-n. Note that a value of the set frequency is equal to the value set to the receiver 11-1.

(Operation S20) The controller 13 performs a process the same as that performed in operation S15 and operation S16 so as to check an error state of the receiver 11-n. When it is determined that an error has occurred, the controller 13 performs the sweep control as described above so that fine control is performed such that a frequency value obtained when the error is removed is set to the local oscillation light source 11a-n.

(Operation S21) The controller 13 transmits an instruction for connecting an output terminal of the receiver 11-n to a port p1 to which an output terminal of the receiver 11-1 has been connected. The switch 17 performs switching in accordance with the instruction.

By this, with the configuration of the optical receiving apparatus 10-4, protection against generation of an error in a receiver in system operation may be attained. For example, when a device error (failure) occurs in a receiver in a general optical receiving apparatus, a long period of time is used for recovery since the receiver is exchanged to a new one. However, with the configuration of the optical receiving apparatus 10-4, a protection operation may be performed within a short period of time.

As described above, the optical receiving apparatus 10 is configured such that an optical signal which is subjected to the Drop operation from the WDM line is monitored and the oscillation frequencies of the local oscillators included in the receivers are appropriately set in accordance with information on monitored frequencies (wavelengths).

With this configuration, even when an optical signal frequency is changed owing to line switching or the like, oscillation frequencies of local oscillators may be appropriately set while an allowable frequency difference of digital coherent reception is satisfied. Accordingly, the frequency offset may be corrected and the transmission quality may be improved.

Furthermore, since the oscillation frequencies are finely controlled in accordance with insufficient reliability amount of the monitor, even when reliability of the monitor is insufficient, the oscillation frequencies of the local oscillators may be set with high reliability. Moreover, since protection control is performed using a spare receiver, even when an error has occurred in a receiver, signal communication (recovery) may be performed at high speed.

Although the embodiments have been described hereinabove, the components in the embodiments may be replaced by other components having the same functions. For example, the controller 13 described above may include programs, a memory which stores data, and a processor which executes the programs and some of the functions of the optical receiving apparatus 10 described above may be realized by software. Furthermore, other arbitrary components or operations may be added.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical receiving apparatus, comprising:
   a receiver configured to perform coherent reception by mixing first light of a received optical signal and second light generated by a local oscillator;
   a monitor configured to monitor a first frequency of the first light; and
   a controller configured to control a second frequency of the second light, based on a difference between the first frequency and the second frequency so as to reduce the difference, the controller controlling the second frequency of the second light by:
   adding a difference between the first frequency and second frequency to the second frequency;
   after the adding, determining whether an error occurs in the receiver; and
   when an error occurs in the receiver, sweeping a range for the second frequency so to set the second frequency at a frequency at which the error is removed, the range being determined by subtracting an allowable range of the difference between the first frequency and the second frequency from a sum of a value indicating reliability of the second frequency of the second light generated by the local oscillator and a value indicating reliability of the first frequency of the first light monitored by the monitor.

2. The optical receiving apparatus according to claim 1, wherein, after the error is removed, the controller sets the second frequency at an oscillation frequency obtained when the error is removed.

3. An optical receiving apparatus, comprising:
   a wavelength de-multiplexer configured to perform wavelength de-multiplexing on a wavelength division multiplexing optical signal;
   a plurality of receivers configured to perform coherent reception by mixing first light of optical signals having de-multiplexed wavelengths and second light generated by local oscillators, each of the plurality of receivers being arranged corresponding with each of the de-multiplexed wavelengths;
   a monitor configured to monitor first frequencies of the first light; and
   a controller configured to control second frequencies of the second light, based on each of differences between the first frequencies and the second frequencies so as to reduce each of the differences, the controller controlling the second frequencies of the second light by:
   adding a difference between the first frequencies and the second frequencies to the second frequencies, respectively;
   after the adding, determining whether an error occurs in the receiver; and
   when an error occurs in the receiver, sweeping a range for the second frequencies so to set the second frequencies at frequencies at which the error is removed, the range being determined by subtracting an allowable range of the difference between the first frequencies and the second frequencies from a sum of a value indicating reliability of the second frequencies of the second light generated by the local oscillator and a value indicating reliability of the first frequencies of the first light monitored by the monitor.

4. An optical receiving apparatus, comprising:
   a branch unit configured to branch a wavelength division multiplexing optical signal, each of the branched optical signals corresponding with each of a plurality of paths;
   a plurality of receivers configured to perform coherent reception by mixing first light of optical signals having a wavelength passed from the branched optical signals and second light generated by local oscillators, each of the plurality of receivers being arranged corresponding with each of the plurality of paths;
   a monitor configured to monitor first frequencies of the first light; and a controller configured to control second frequencies of the second light, based on each of differences between the first frequencies and the second frequencies so as to reduce each of the differences, the controller controlling the second frequencies of the second light by:
  adding a difference between the first frequencies and the second frequencies to the second frequencies, respectively;
  after the adding, determining whether an error occurs in the receiver; and
  when an error occurs in the receiver, sweeping a range for the second frequencies so to set the second frequencies at frequencies at which the error is removed, the range being determined by subtracting an allowable range of the difference between the first frequencies and the second frequencies from a sum of a value indicating reliability of the second frequencies of the second light generated by the local oscillator and a value indicating reliability of the first frequencies of the first light monitored by the monitor.

5. The optical receiving apparatus according to claim 4, wherein the plurality of receivers include tunable filters capable of passing optical signals having predetermined wavelengths from the branched optical signals, and the controller controls light to be passed through the tunable filters, based on each of the differences.

6. The optical receiving apparatus according to claim 5, further comprising:
  a switch configured to couple an output terminal of one of the plurality of receivers with a predetermined output port,
  wherein,
    when the controller recognizes a failure in one of the plurality of receivers,
    the controller sets, to a spare receiver which is a spare one of the plurality of the receivers, the passed wavelength of the first light performed coherent reception in the receiver with the failure and the second frequency of the second light generated by the local oscillator included in the receiver with the failure, and
    the switch uncouples an output port corresponding to the receiver with the failure with an output terminal of the receiver with the failure, and couples the output port with an output terminal of the spare receiver.

\* \* \* \* \*